United States Patent [19]
Caviasca et al.

[11] Patent Number: 5,136,180
[45] Date of Patent: Aug. 4, 1992

[54] VARIABLE FREQUENCY CLOCK FOR A COMPUTER SYSTEM

[75] Inventors: Kenneth P. Caviasca, Phoenix; Tein-Yow Yu, Tempe; Ned D. Garinger, Chandler; Pratiksh Parikh, Mesa; W. Henry Potts, Tempe; James B. Nolan, Phoenix, all of Ariz.

[73] Assignee: VLSI Technology, Inc., San Jose, Calif.

[21] Appl. No.: 655,018

[22] Filed: Feb. 12, 1991

[51] Int. Cl.$^5$ .................. H03K 5/13; H03K 17/00; H04Q 3/00; H03B 00/00
[52] U.S. Cl. .......................... 307/269; 307/271; 328/104; 328/137; 328/154; 331/49
[58] Field of Search ............. 307/269, 271, 510, 479, 307/480, 522, 524; 328/104, 137, 154, 61, 63, 72; 331/49; 395/550

[56] References Cited

U.S. PATENT DOCUMENTS 4,254,492  3/1981  McDermott, III ............... 331/49
4,949,052  8/1990  Chigira ............................ 307/219

OTHER PUBLICATIONS

David C. Clegg, "Solid-State digital clock", Feb. 1975, pp. 69–73.

Primary Examiner—Stanley D. Miller
Assistant Examiner—Sinh Tran
Attorney, Agent, or Firm—Douglas L. Weller

[57] ABSTRACT

A circuit generates a system clock signal. On a first input of the circuit a first oscillating signal is placed. On a second input, a second oscillating signal may be placed. Clock sense logic is connected to the second input. The clock sense logic detects whether the second oscillation signal is present on the second input. When the second oscillating signal is not present on the second input, the first oscillating signal is selected to be used to generate the system clock. When the second oscillating signal is present on the second input, the second oscillating signal is selected to be used to generate the system clock. The selected oscillating signal is divided to produce the system clock signal. A first frequency divider divides the selected oscillating signal by a first amount. In parallel, a second frequency divider divides the selected oscillating signal by a second amount. A selector, for example, a multiplexor, selects output from either the first frequency divider or the second frequency divider as the system clock signal. When the first oscillating signal is being used to generate the system clock, the second input may be used to control the selection of frequency dividers.

11 Claims, 2 Drawing Sheets

VARIABLE FREQUENCY CLOCK FOR A COMPUTER SYSTEM

BACKGROUND

The present invention concerns generation of a clock signal used to access peripheral devices in a computing system.

Clock signals are used to control the speed of operation of computer systems. The frequency of a clock signal depends upon the speed at which the logic of the computing system is able to operate.

In many computing system, more than a single clock signal is used. For example, in computers compatible with PC AT computers manufactured by IBM corporation, two clock signals are used. The first clock signal, called a CPU clock, is used for the central processing unit (CPU). The second clock signal, called the system clock, is used to control the speed at which peripheral devices of the computing system transfer information over an input/output bus.

Generally, the CPU clock and the system clock are generated by clock generator circuit logic. The clock generator circuit logic typically receives a clock oscillation signal. The frequency of the clock oscillation signal is typically at least twice the maximum frequency at which a CPU is anticipated to be able to run. The clock signal generator then divides the frequency by whole integers in order to produce the CPU clock and the system clock. For example, when the clock oscillation signal oscillates at a frequency of 32 megahertz (MHz), the CPU is able to operate at 16 MHz and peripherals on the I/O bus are able to transfer data at 8 megahertz, then the clock generator circuit logic divides the clock oscillation signal by two to produce the CPU clock and divides the clock oscillation signal by four to produce the system clock.

One shortfall with the above-described prior art clock generator circuit logic is the lack of flexibility. For example, different peripheral devices are able to transfer information at different rates over the input/output bus. In some systems flexibility in selection of clock speed for various peripherals have been implemented using software to make the selection. However, the use of software significantly adds to the complexity of the circuit.

SUMMARY OF THE INVENTION

In accordance with the preferred embodiment of the present invention, a circuit is provided which generates a system clock signal. On a first input of the circuit a first oscillating signal is placed. The first oscillating signal is used, for example, to generate a clock signal for the central processing unit (CPU) of the computing system. On a second input, a second oscillating signal may be placed. Clock sense logic is connected to the second input. The clock sense logic detects whether the second oscillating signal is present on the second input. When the second oscillating signal is not present on the second input, the first oscillating signal is selected to be used to generate the system clock. When the second oscillating signal is present on the second input, the second oscillating signal is selected to be used to generate the system clock.

The selected oscillating signal is divided to produce the system clock signal. A first frequency divider divides the selected oscillating signal by a first amount. In parallel, a second frequency divider divides the selected oscillating signal by a second amount. A selector, for example, a multiplexor, selects output from either the first frequency divider or the second frequency divider as the system clock signal. The selection is based upon the speed of peripherals. For example, a selected peripheral such as video DRAM may be able to transfer data at a higher frequency than many other peripherals. Therefore, when transfers are being done by the selected peripheral, output is selected from the frequency divider which divides the frequency of the selected signal by the least amount. When the first oscillating signal is being used to generate the system clock, the second input may be used to control the selection of frequency dividers. For example, when a peripheral which has a fast transfer rate is being used, a first voltage level is placed on the second input. The selector then selects the frequency divider which produces the signal with the higher frequency of oscillation. When a peripheral which has a slower transfer rate is being used, a second voltage level is placed on the second input. The selector then selects the frequency divider which produces the signal with the lower frequency of oscillation.

The circuit may additionally include a clock control register. The clock control register is used to store, for example, the signal on the second input when the first oscillating signal is being used to generate the system clock. The clock control register also stores, for example, control bits which determine the amount the first frequency divider and the second frequency divider frequency divide oscillating signals.

DESCRIPTION O THE PREFERRED EMBODIMENT

Figure 1:
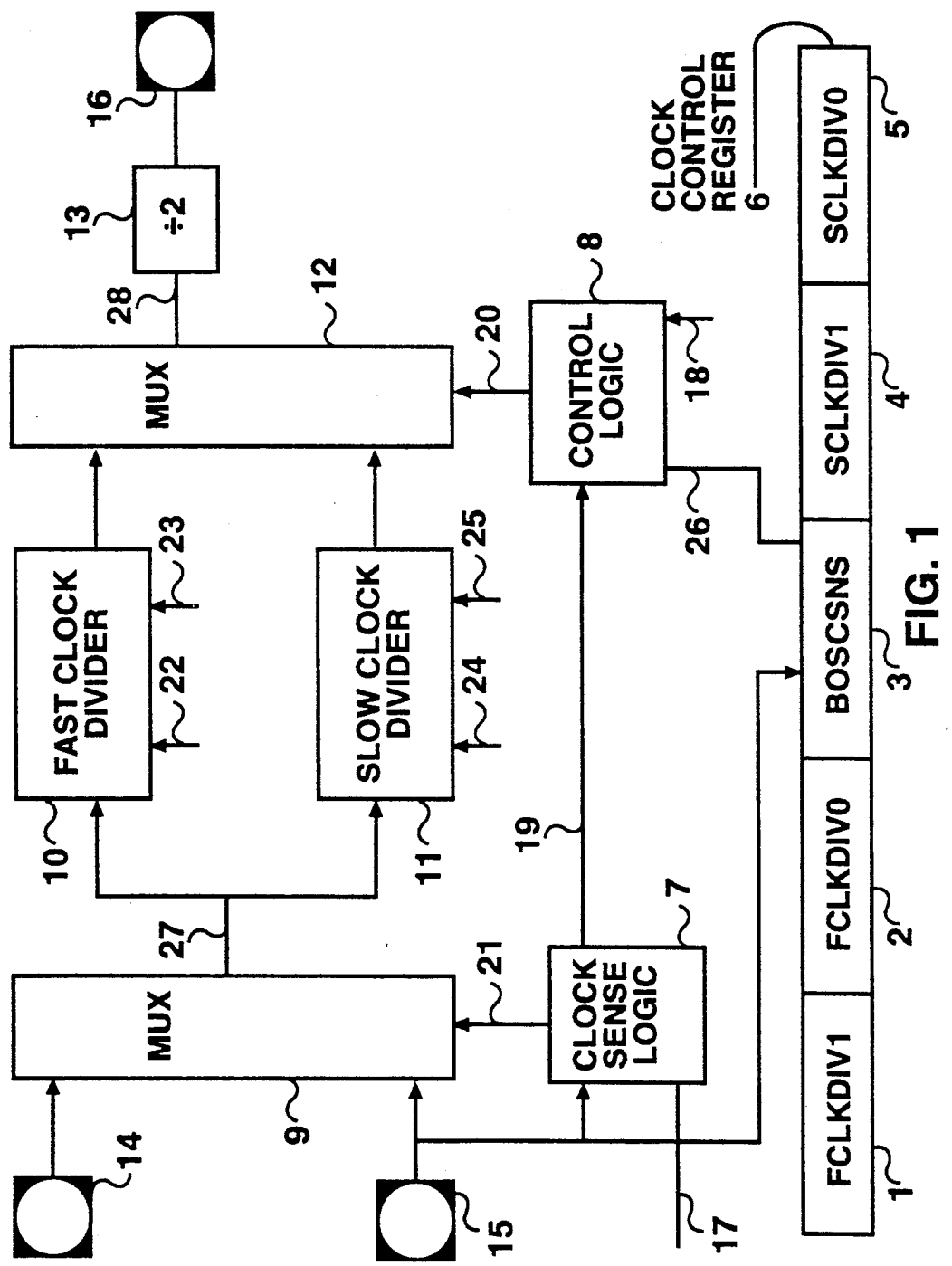
FIG. 1 is a block diagram of clock generator circuit logic in accordance with the preferred embodiment of the present invention.

In FIG. 1 clock generator circuit logic is shown. A clock oscillation signal is placed on an input pad 14. The clock oscillation signal is used to generate a CPU clock signal by means which are commonly understood in the art. An input pad 15 is available for receiving a bus oscillation signal.

Clock sense logic 7 is used to sense whether a bus oscillation signal is present on input pad 15. Clock sense logic 7 controls a multiplexor 9 through a control input 21. When clock sense logic 7 detects a bus oscillation signal on input pad 15, clock sense logic 7 directs multiplexor 9 to forward the bus oscillation signal through to a multiplexor output 27. When clock sense logic 7 does not detect a bus oscillation signal on input pad 15, clock sense logic 7 directs multiplexor 9 to forward the initial clock signal on input pad 14 through to multiplexor output 27.

Multiplexor output 27 is received by a fast clock divider 10 and a slow clock divider 11. Fast clock divider 10 divides the frequency of the signal on multiplexor output 27 by an amount determined by a high order input 22 and a low order input 23. Slow clock divider 10 divides the frequency of the signal on multiplexor output 27 by an amount determined by a high order input 24 and a low order input 25.

A multiplexor 12 receives a frequency divided signal from fast clock divider 10 and a frequency divided signal from slow clock divider 11. Based on a control input 20 from control logic 8, multiplexor 12 selects a frequency divided signal to place on a multiplexor output 28. A divider circuit 13 further divides the frequency of the signal by two to produce the system clock on an output pad 16.

The clock generator circuit logic also contains a clock control register 6. In the preferred embodiment of the present invention, clock control register 6 contains 5 bits. A bit 1 is connected to high order input 22 of fast clock divider 10. A bit 2 is connected to low order input 23 of fast clock divider 10. A bit 4 is connected to high order input 24 of slow clock divider 11. A bit 5 is connected to low order input 25 of slow clock divider 11. A bit 3 is used to store a value placed on input pad 15 when a bus oscillation signal is not placed on input 15. The value stored in bit 3 is forwarded to control logic 8 through a control logic input 26. Control logic 8 also receives a control logic input 19 from clock sense logic 7 and a control logic input 18. A signal on control logic input 18 may indicate, for example, when a selected peripheral such as video DRAM is being accessed over the input/output bus.

In general, the clock generator circuit operates as follows. Upon start-up, clock sense logic 7 checks to determine whether a bus oscillation signal is present on input pad 15. Bus oscillation signal may typically be in the range of (4 MHz to 32 MHz)

If, at start-up, there is a bus oscillation signal present on input pad 15, clock sense logic places a logic 0 on control input 21 and a logic 0 o control logic input 19. Based on the logic 0 on control input 21, multiplexor 9 selects the bus oscillation signal on input pad 15 to forward to multiplexor output 27. Fast clock divider 10 divides the frequency of the bus oscillation signal by an amount determined by the values in bit 1 and bit 2 of clock control register 6. Typically, the amount fast clock divider 10 will divide by is one, two or three. Slow clock divider 11 divides the frequency of the bus oscillation signal by an amount determined by the values in bit 4 and bit 5 of clock control register 6. Typically, the amount slow clock divider 11 will divide by is one, two, three or four.

When control logic input 18 is at logic 1, indicating a selected peripheral, e.g., video DRAM, is being accessed over the input/output bus, then control logic 8 places a logic 1 on control input 20. This causes multiplexor 12 to forward the output of fast clock divider 10 through to multiplexor output 28. After being divided by frequency divider 13, the resulting signal is placed on output pad 16 and used as the system clock.

When control logic input 18 is at logic 0, indicating the selected peripheral is not being accessed over the input/output bus, then control logic 8 places a logic 0 on control input 20. This causes multiplexor 12 to forward the output of slow clock divider 11 through to multiplexor output 28. After being divided by frequency divider 13, the resulting signal is placed on output pad 16 and used as the system clock.

If, at start-up, there is no bus oscillation signal present on input pad 15, clock sense logic places a logic 1 on control input 21 and a logic 1 on control logic input 19. Based on the logic 1 on control input 21, multiplexor 9 selects the clock oscillation signal on input pad 14 to forward to multiplexor output 27. Fast clock divider 10 divides the frequency of the clock oscillation signal by an amount determined by the values in bit 1 and bit 2 of clock control register 6. Slow clock divider 11 divides the frequency of the clock oscillation signal by an amount determined by the values in bit 4 and bit 5 of clock control register 6.

When control logic input 18 is at logic 1, indicating the selected peripheral is being accessed over the input/output bus, or when control logic input 26 is at logic 1, indicating a logic one has been placed on input pad 15, then control logic 8 places a logic 1 on control input 20. This causes multiplexor 12 to forward the output of fast clock divider 10 through to multiplexor output 28. After being divided by frequency divider 13, the resulting signal is placed on output pad 16 and used as the system clock.

When control logic input 18 and logic input 26 are both at logic 0, then control logic 8 places a logic 0 on control input 20. This causes multiplexor 12 to forward the output of slow clock divider 11 through to multiplexor output 28. After being divided by frequency divider 13, the resulting signal is placed on output pad 16 and used as the system clock.

The use of multiplexor 12 to select either a signal from fast clock divider 10 or slow clock divider 11 allows the system clock speed to be changed very quickly, slowed down only by propagation time through multiplexor 12.

Figure 2:
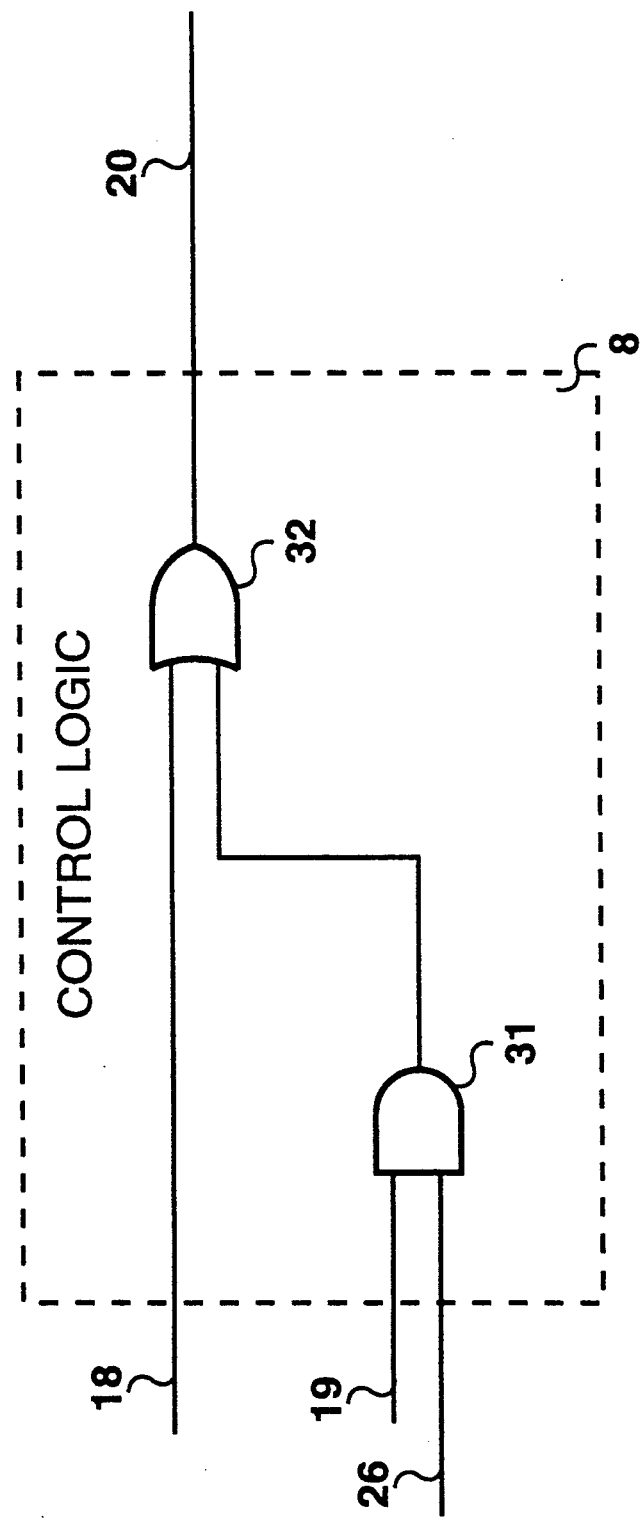
FIG. 2 shows detail of a logic circuit within the clock generator circuit logic shown in FIG. 1 in accordance with the preferred embodiment of the present invention.

FIG. 2 shows how control logic 8 may be implemented using a logical AND gate 31 and a logical OR gate 32.

We claim:

1. A circuit for generating a system clock signal, the circuit comprising:

a first input for receiving a first oscillating signal;

a second input;

detection means, coupled to the second input, for detecting whether a second oscillating signal is being placed on the second input;

dividing means for frequency dividing a received oscillating signal to produce the system clock signal the dividing means including:

a first frequency divider which divides the received oscillating signal by a first amount to produce a first divided oscillating signal;

a second frequency divider which divides the received oscillating signal by a second amount to produce a second divided oscillating signal; and, a first selection means for selecting one of the first divided oscillating signal and the second divided oscillating signal as the system clock signal; and second selection means, coupled to the first input, the second input, the detection means and the dividing means, for selecting the first oscillating signal as the received oscillating signal when the detection means does not detect the second oscillating signal being placed on the second input, and for selecting the second oscillating signal as the received oscillating signal when the detection means detects the second oscillating signal being placed on the second input, wherein the dividing means receives the received oscillating signal from the second selection means.

2. A circuit as in claim 1 wherein the first selection means includes control logic, the control logic having a control input, the control logic, responsive to a first control signal placed on the control input, causing the first selection means to select one of the first divided oscillating signal and the second divided oscillating signal as the system clock signal.

3. A circuit as in claim 2 wherein the control logic is additionally coupled to the second input of the circuit, the control logic being additionally responsive to a second control signal placed on the second input when the detection means does not detect the second oscillating signal is being placed on the second input.

4. A circuit as in claim 3 additionally comprising a clock control register which includes a first bit, control logic being coupled to the second input of the circuit through the first bit of the clock control register.

5. A circuit as in claim 4 wherein the clock control register additionally includes at least one bit, coupled to the first frequency divider, which determines the first amount by which the first frequency divider divides the received oscillating signal to produce the first divided oscillating signal value, and the clock control register additionally includes at least one bit, coupled to the second frequency divider, which determines the second amount by which the second frequency divider divides the received oscillating signal to produce the second divided oscillating signal value.

6. A circuit as in claim 1 wherein the first selection means includes control logic, the control logic being coupled to the second input of the circuit, the control logic being responsive, when the detection means does not detect the second oscillating signal being placed on the second input, to a control signal placed on the second input.

7. A circuit as in claim 6 additionally comprising a clock control register which includes a first bit, control logic being coupled to the second input of the circuit through the first bit of the clock control register.

8. A circuit as in claim 7 wherein
the clock control register additionally includes at least one bit, coupled to the first frequency divider, which determines the first amount by which the first frequency divider divides the received oscillating signal to produce the first divided oscillating signal value, and the clock control register additionally includes at least one bit, coupled to the second frequency divider, which determines the second amount by which the second frequency divider divides the received oscillating signal to produce the second divided oscillating signal value.

9. A method for generating a clock signal, the method comprising the steps of:

(a) receiving a first oscillating signal on a first input;
(b) detecting whether a second oscillating signal is being placed on a second input;
(c) when, in step (b) a second oscillating signal is not detected on the second input, selecting the first oscillating signal as the clock signal;
(d) when, in step (b) a second oscillating signal is detected on the second input, selecting the second oscillating signal as the clock signal; and,
(e) frequency dividing the selected clock signal, the frequency dividing including the following substeps
(e.1) using a first frequency divider to frequency divide the selected clock signal to produce a first frequency divided clock signal,
(e.2) concurrently with step (e.1), using a second frequency divider to frequency divide the selected clock signal to produce a second frequency divided clock signal, and
(e.3.) selecting one of the first frequency divided clock signal and the second frequency divided clock signal as a system clock signal.

10. A method as in claim 9 wherein in substep (e.3), the first frequency divided clock signal is selected as the clock signal when a selected peripheral is being addressed.

11. A method as in claim 9 wherein when in step (c) the first oscillating signal is selected as the clock signal, the selection in step (e.3) is based upon a signal placed on the second input.

* * * * *